Dec. 15, 1970 M. PROSS 3,548,182

FULL ADDER UTILIZING NOR GATES

Filed Aug. 16, 1967

INVENTOR
*Martin Pross*

BY

ATTYS.

United States Patent Office 3,548,182
Patented Dec. 15, 1970

3,548,182

FULL ADDER UTILIZING NOR GATES

Martin Pross, Munich, Germany, assignor to Siemens Aktiengesellschaft, a corporation of Germany Filed Aug. 16, 1967, Ser. No. 660,992
Claims priority, application Germany, Aug. 18, 1966, S 105,419
Int. Cl. G06f 7/385
U.S. Cl. 235—176 2 Claims

ABSTRACT OF THE DISCLOSURE

A circuit arrangement for the addition of two binary digit numbers with consideration of a carry-over originating from the next lower step, wherein the values are present in the original form and the inversion, and the partial sum is formed from the two terms of a sum and its inversions through combination in a first or second NOR gate respectively, the output values of which are fed to a third gate having an OR and a NOR output, on which the partial sum and its inversion appear, and are respectively combined with the associated carry-over or its inversion by means of fourth and fifth NOR gates, with the carry-over or its inversion respectively being fed to a sixth NOR gate supplying the sum, characterised in that the carry-over value and its inversion each consist of two components which, when combined yield the value itself of the carry-over or its inversion respectively, said fourth and fifth NOR gates having three inputs to the second and third inputs of one the components of the carry-over are fed, and to the second and third inputs of the other the components of its inversion are fed, thereby combining the respective associated components, and a further NOR gate having three inputs, to which are applied components of the carry-over and the inverted partial sum, with the NOR gate receiving the inverted carry-over and the further NOR gate respectively supply one of the components of the carry-over or the inverted carry-over of this step, and the combination of the terms of a sum or the inverted terms of a sum respectively form the other components of the carry-over or the inverted carry-over respectively.

In modern calculating machines all the calculating operations can be traced back to additions. In this connection, for high speed data processing machines the use of parallel adding devices has steadily increased. These machines have the advantage over series adding machines in that the time for adding two numbers is considerably shorter than in series adding devices. However, with respect to parallel adding devices the disadvantage of higher cost must be taken into consideration. Thus, for each digit of a number to be added, a complete adding device must be available, which forms the sum and, if necessary, a carry-over from the two terms of a sum. The resulting value of the carry-over is fed to the adding device of the next step of higher value, which makes the addition of the two terms of a sum of the next higher place and of the carry-over supplied from the next lower step. The carry-over resulting from the addition of these three values then, in turn, is made available for the next higher step, etc., until the carry-over has travelled through to the highest step. Consequently the addition of two numbers is to a high degree dependent on the delay time of the carry-over.

In the drawings, wherein like reference characters indicate like or corresponding parts:

Figure 1:
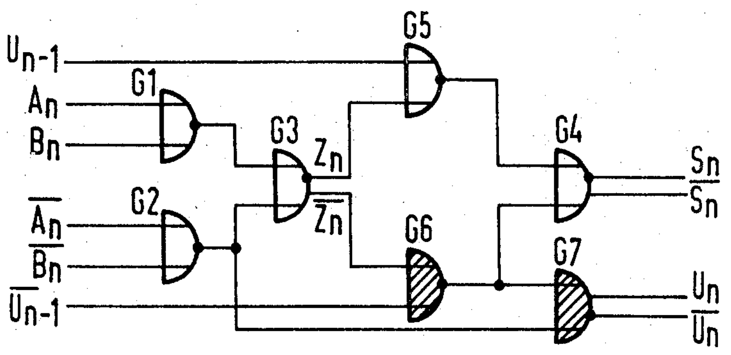
Fig.1 PRIOR ART
FIG. 1 is a diagram of an adding arrangement illustrating a known circuit.

FIG. 1 illustrates a complete adding step of an adding device of the prior art, in which two terms of a sum established at the inputs A$n$ and B$n$ are mixed with the aid of a first NOR gate G1, and the two inverted terms of the sum established at the inputs $\overline{A}n$ and $\overline{B}n$ are mixed with the aid of the NOR gate G2. The signals appearing at the outputs of the NOR gates G1 and G2 are fed to a third gate G3 at whose NOR output Z$n$ the partial sum and at whose OR output $\overline{Z}n$ the inverted partial sum Z$n$ and the carry-over U$n$–1 on the one hand, or the inverted partial sum $\overline{Z}n$ and the inverted carry-over $\overline{U}n$–1 on the other hand, are mixed by means of two additional NOR gates now mixed with the carry-over U$n$–1 by means of two additional NOR gates G5 and G6. The output signals of these two NOR gates are combined with the aid of the NOR gate G4 into the final sum S$n$. The formation of the carry-over is so effected in this adding circuit that the NOR gate G6 combining the inverted carry-over $\overline{U}n$–1 and the inverted partial sum $\overline{Z}n$ is connected with an input of an additional NOR gate G7, wnose other input is connected with the output of NOR gate G2. Thus, the new invented carry-over $\overline{U}n$ is created at the NOR output of gate G7, and the carry-over U$n$ at the OR output of gate G7. Thus, as is apparent from the preceding description and from FIG. 1, the carry-over or its inversion respectively must travel in the adding process through two NOR gates. In an $n$-digit parallel adding device such a carry-over must be transmitted through a maximum of $n-1$ places. Therefore, certain limits are imposed on the calculation speed of such parallel adding devices by the delay time of the carry-over value.

It is the problem of the present invention to produce an arrangement fo rthe addition of two binary numbers with consideration of a carry-over originating from the next lower step, wherein the addition processes can be considerably increased through a reduction in the delay time of the carry-over. This can be accomplished utilizing the broad concept of the arrangement of FIG. 1, but in which the value of the carry-over and its inversion each consists of two components which, when mixed, yields the value itself of the carry-over or its inversion respectively and these two components are cumulatively combined at the second input and an additional third input of the NOR gate which receives the carry-over or its inverted carry-over respectively, and in which an additional NOR gate with three inputs is provided, to which are applied the components of the carry-over and the inverted partial sum, so that the NOR gate receiving the inverted carry-over and such additional NOR gate yield one of the components of the carry-over of this step or its inversion respectively, and that the combination of the two terms of a sum or of the inverted two terms of a sum respectively form the other components of the carry-over or of the inverted carry-over respectively.

Figure 2:
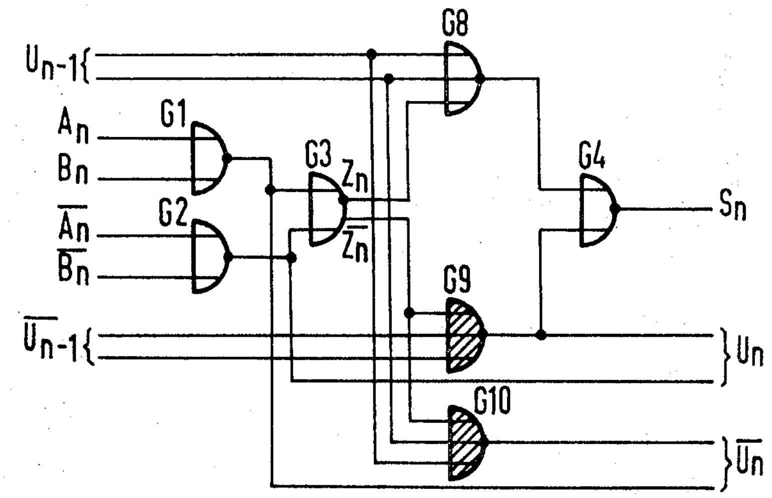
FIG. 2 is a similar diagram of an adding arrangement, illustrating a circuit embodying the invention.

FIG. 2 illustrates a form of construction of the invention in which the combination of the two terms of a sum A$n$, B$n$ and the inverted two terms of a sum $\overline{A}n$, $\overline{B}n$ by means of the NOR gates G1, G2 and the partial sum formation by means of NOR gate G3 corresponds to the circuit of FIG. 1, so that further explanation of such first steps is unnecessary. The partial sum Z$n$ and its inversion $\overline{Z}n$ are fed to two NOR gates G8 and G9 which, according to the invention, have three inputs, in which, in each case, the carry-over U$n$–1 or $\overline{U}n$–1 respectively, is applied to the second and third inputs. The components of the carry-over U$n$–1 or its inversion $\overline{U}n$–1 lying at the 2 inputs are so composed that in each case the combination of both components yields the carry-over itself. This means that the carry-over is equal to 1, at least when one components is equal to 1. The combination of the components takes place in the NOR gates G8 and G9.

Thus, a combination of the partial sum Z*n* with the carry-over U*n*–1 occurs in the NOR gate G8 while a combination of the inverted divisional $\overline{Z}n$ with the inverted carry-oven $\overline{U}n$–1 occurs in the NOR gate G9. The output signals of NOR gates G8 and G9 are now fed to the gate G4 as known in the prior art, at whose NOR output the sum S*n* appears. The output of NOR gate G9 at the same time yields a component of the new carry-over U*n*, with the other component of the carry-over U*n* being obtained from the output of NOR gate G2. Likewise, the output of NOR gate G1 yields a component of the carry-over $\overline{U}n$. To create the other componet of the inverted carry-over there is provided an additional NOR gate G10, to whose first input is applied the OR output of gate G3 and to whose two other inputs are applied the value of the carry-over U*n*–1 of the preceding step. It is apparent from FIG. 2 that each value of the carry-over must travel through only a single NOR gate to arrive at the next step. Thus, the canry-over U*n*–1 travels only through gate G10 and the inverted carry-over $\overline{U}n$–1 only through NOR gate G9. Consequently, with an arrangement in accordance with the invention a division into equal halves of the delay times of the carry-over is achieved as compared with the arrangement known in prior art. Since the addition time of such a parallel adding device is determined primarily by the travel time of the carry-over, a halving of the addition time is achieved. In the following table, some addition processes are symbolically indicated.

| Un–1 | An | Bn | $\overline{An}$ | $\overline{Bn}$ | $\overline{Un-1}$ | Sn | Un | $\overline{Un}$ |
|---|---|---|---|---|---|---|---|---|
| 1 1 | 1 | 1 | 0 | 0 | 0 0 | 1 | 01 | 00 |
| 1 1 | 1 | 0 | 0 | 1 | 0 0 | 0 | 10 | 00 |
| 0 0 | 0 | 1 | 1 | 0 | 1 0 | 1 | 00 | 10 |

Naturally, the principle of the invention is not limited only to an adding device with gates having a NOR and OR output, and can also be applied with pure NOR gates.

Changes may be made within the scope and spirit of the appended claims which define what is believed to be new and desired to have protected by Letters Patent.

I claim:

1. A circuit arnangement for the addition of two binary digit numbers with consideration of a carry-over originating from the next lower step, in which the carry-over value and its inversion each consist of two components which, when combined yield the value itself of the carry-over or its inversion nespectively, comprising a first NOR gate having two inputs for the two terms of a sum, a second NOR gate having two inputs for the inversion of the two terms of the sum, in which first and second NOR gates one component of the outgoing carry-over and one component of the inverted outgoing carry-over respectively are formed, the output values of said gates being fed to respective inputs of third gate means having an inverting output and a noninverting output, at the inverting output of which the partial sum appears and at the noninverting output of which its inversion appears, fourth and fifth NOR gates each having three inputs, to respective inputs of said fourth NOR gate the partial sum and the components of the incoming carry-over are applied, and to respective inputs of said fifth NOR gate the inverted partial sum and the components of the inverted incoming carry-over are applied, a sixth NOR gate to respective inputs of which the outputs of said fourth and fifth NOR gates are connected, an output of said sixth NOR gate supplying the sum, and a further NOR gate having three inputs, to which the inverted partial sum and the components of the incoming carry-over are fed, the output of said further NOR gate forming the second component of the inverted outgoing carry-over, while the output of said fifth NOR gate forms the second component of the uninverted outgoing carry-over.

2. A circuit arrangement according to claim 1, wherein said third gate means comprises a third gate having a NOR and an OR output at which the respective partial sum and its inversion appear.

References Cited

UNITED STATES PATENTS

| | | | |
|---|---|---|---|
| 3,074,640 | 1/1963 | Maley | 235—176 |
| 3,075,093 | 1/1963 | Boyle | 235—176 |
| 3,291,973 | 12/1966 | Rasche | 235—176 |

EUGENE G. BOTZ, Primary Examiner

J. F. GOTTMAN, Assistant Examiner

U.S. Cl. X.R.

235—175